United States Patent
Mutha et al.

(10) Patent No.: US 11,212,282 B2
(45) Date of Patent: Dec. 28, 2021

(54) CONNECTED [I.E. LINKED] ACCOUNTS OF A USER KEEPS SIGNED STATE IN ALIVE OF OTHER CONNECTED [I.E. LINKED] ACCOUNTS

(71) Applicant: Microsoft Technology Licensing, LLC, Redmond, WA (US)

(72) Inventors: Akshay Navneetlal Mutha, Sammamish, WA (US); Namit Gupta, Redmond, WA (US); Rohit Dilip Mahale, Issaquah, WA (US); Alexandra Veronica Rinja, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 16/413,437

(22) Filed: May 15, 2019

(65) Prior Publication Data
US 2020/0366678 A1 Nov. 19, 2020

(51) Int. Cl.
*H04L 29/06* (2006.01)
*H04L 29/08* (2006.01)

(52) U.S. Cl.
CPC ...... *H04L 63/0884* (2013.01); *H04L 63/0815* (2013.01); *H04L 67/145* (2013.01); *H04L 67/22* (2013.01)

(58) Field of Classification Search
CPC ............. H04L 63/0815; H04L 63/0884; H04L 63/102; H04L 63/104; H04L 67/145; H04L 67/22; H04L 67/306; H04W 12/082
See application file for complete search history.

(56) References Cited

U.S. PATENT DOCUMENTS

| 8,024,439 B2 | 9/2011 | Nalla et al. |
| 8,327,428 B2 | 12/2012 | Guo et al. |
| 2007/0162963 A1 | 7/2007 | Penet et al. |
| 2012/0023565 A1 | 1/2012 | Tumanyan |
| 2012/0317208 A1 | 12/2012 | Sousa et al. |

(Continued)

FOREIGN PATENT DOCUMENTS

CN 102647291 A 8/2012

OTHER PUBLICATIONS

"International Search Report and Written Opinion Issued in PCT Application No. PCT/US2020/028024", dated Jul. 7, 2020, 10 Pages.

*Primary Examiner* — Gil H. Lee

(57) ABSTRACT

A method and system directed to performing account activity tracking is provided. More specifically, user activity associated with a user's first account may influence when a user's second account is signed out due to inactivity. Accordingly, an activity request including a first identifier associated with a first user account may be received from a first entity, and based on the first identifier associated with the first user account, a second identifier associated with a second user account may be retrieved, where the first identifier and the second identifier are linked to one another. Activity information for the second identifier associated with the second user account may be obtained which may be provided to the entity. A decision as to whether or not to keep the user signed in may be based on the activity information.

20 Claims, 12 Drawing Sheets

(56) References Cited

U.S. PATENT DOCUMENTS

| | | | |
|---|---|---|---|
| 2015/0081876 A1* | 3/2015 | Pieczul | H04L 67/22 709/224 |
| 2015/0149358 A1 | 5/2015 | Robbin et al. | |
| 2015/0326556 A1* | 11/2015 | Vadura | H04L 63/0815 726/4 |
| 2015/0347209 A1* | 12/2015 | Lyubinin | G06F 21/31 719/313 |
| 2017/0064550 A1 | 3/2017 | Sundaresan et al. | |

* cited by examiner

CONNECTED [I.E. LINKED] ACCOUNTS OF A USER KEEPS SIGNED STATE IN ALIVE OF OTHER CONNECTED [I.E. LINKED] ACCOUNTS

BACKGROUND

When a user is performing work or interacting with one or more service providers, the user generally performs multiple tasks, performs many functions, and interacts with multiple service entities, such as email, business, and/or other service entities. As one example, a user may sign in, or log in, to a first account, such as a work related account to perform work related functions. The user may also sign in, or log in, to a second account, such as a personal account, that provides personal email for example. Alternatively, or in addition, the user may sign in, or login, to a third account that allows a user to check social information. Alternatively, or in addition, the user may sign in or login to a fourth account that allows a user to check a gift card balance, order food, and/or perform banking functions. While each of the first account, second account, third account, and/or fourth account may be different, for example, the first account may be linked to a first user ID and/or a first service, the second account may be linked to a second different user ID and/or second different service, the third account may be linked to a third different user ID and/or a third different service, and/or the fourth account may be linked to a fourth different user ID and/or a fourth different service, the user accessing the accounts is really the same. Accordingly, the user must remain active with each of the first account, second account, third account, and/or fourth account to prevent being logged out from the service entity due to inactivity.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for maintaining an active session in a first user account based on activity information of another user account. In some aspects, an activity request including a first identifier associated with a first user account of a first service entity may be received from the first service entity. For example, the activity request may be received responsive to a period of inactivity associated with the first user account. The first identifier associated with the first user account may be used to retrieve a second identifier associated with a second user account of a second service entity that is linked to the first account. Activity information associated with the second user account may be obtained using the second identifier, and the activity information may be provided to the service entity. Based on the activity information, the service entity may either maintain the active session of the first account or sign out the first user account.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
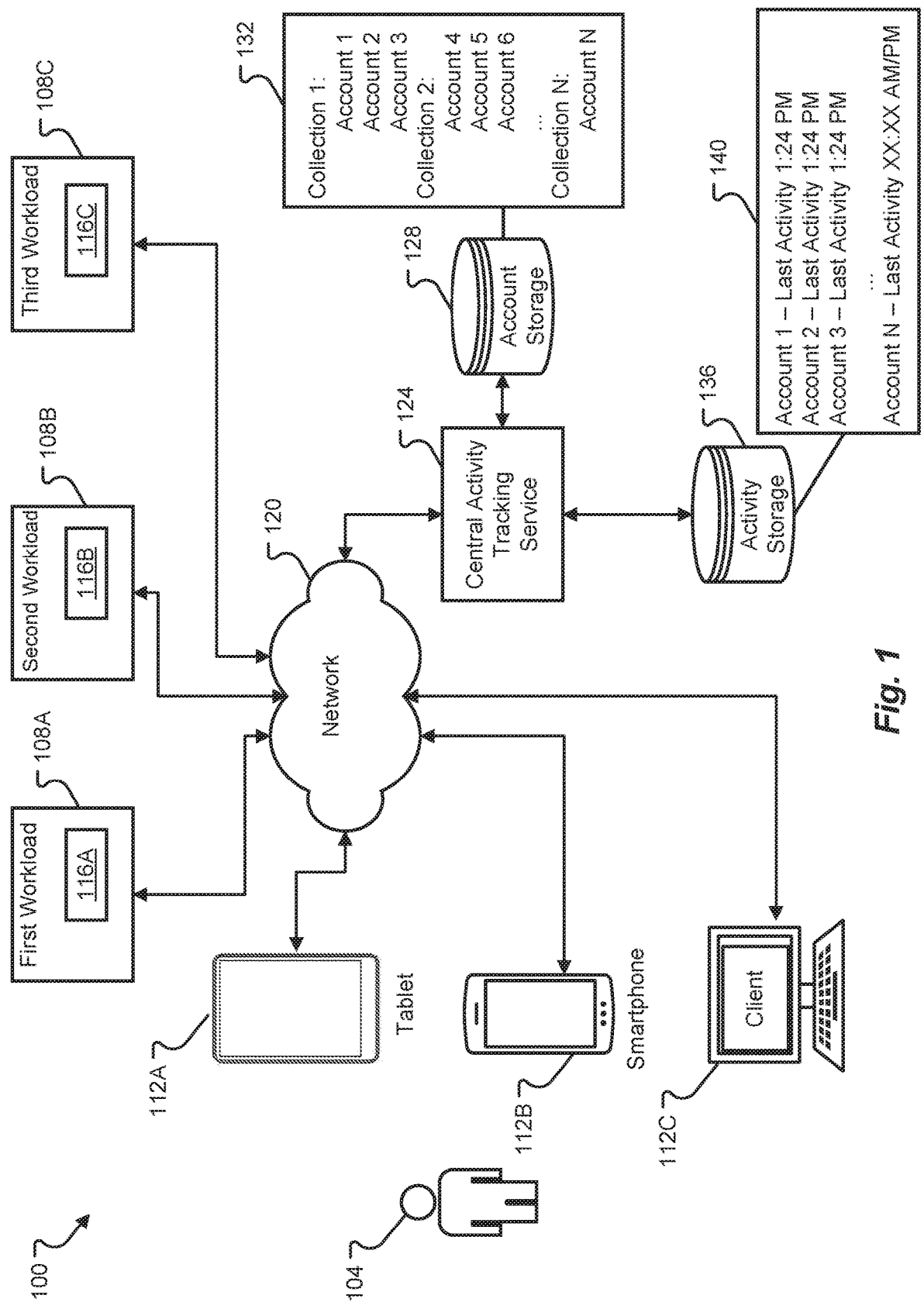
FIG. 1 illustrates details of an account activity tracking system in accordance with the aspects a of the disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Currently, when a user is performing work or interacting with one or more service providers, the user generally performs multiple tasks and performs many functions. For example, a user may sign in, or log in, to a first account, such as a work related account to perform work related functions. The user may also sign in, or log in, to a second account, such as a personal account, that provides personal email for example. Alternatively, or in addition, the user may sign in, or login, to a third account that allows a user to check social information. Alternatively, or in addition, the sure may sign in or login to a fourth account that allows a user to check a gift card balance, order food, and/or perform banking functions. While each of the first account, second account, third account, and/or fourth account may be different, for example, the first account may be linked to a first user ID and/or a first service, the second account may be linked to a second different user ID and/or second different service, the third account may be linked to a third different user ID and/or a third different service, and/or the fourth account may be linked to a fourth different user ID and/or a fourth different service, the user accessing the accounts is really the same. That is, the person is the same. So when a user is active with regard to one of the accounts, the user may be active with some of the other accounts as well. For example, a user may be performing work related functions utilizing the first account, but may pause to check personal email using the second account. However, after a period of time, the user may switch back to using the first account.

In accordance with examples of the present disclosure, and irrespective of an identity provider, such as Microsoft Business, Microsoft Consumer, LinkedIn, Google, Github, Facebook etc., activity information may be acquired from all identity providers. Accordingly, if a user is active in one of their accounts, the user may be kept active in the other accounts as well, that way the user does not get automatically signed out of the other accounts. Stated another way, user activity associated with a user's first account may influence when a user's second account is signed out due to inactivity. A user may be active in one or more of their accounts if they interact with a portion of an application and/or cause a refresh of a security token and/or a reset of a timeout period associated with their session. That is, an active user may be a user which is interactive with the application. A user may become inactive if their last session interaction is greater than a period of time and/or cause an associated security token to expire.

FIG. 1 provides an account activity tracking system 100 in accordance with examples of the present disclosure. A user 104 may interact with a first workload 108A, a second workload 108B, and/or a third workload 108C of the account activity tracking system 100. Each of the workloads 108A-108C may be associated with a different service entity. For example, the first workload 108A may be associated with a business service entity, such as a business website for example. The second workload 108B may be associated with a personal email account service entity, such as an email account provided by outlook.com. The third workload 108C may be associated with a third service entity, such as LinkedIn.com. The user 104 may interact with each of the workloads 108A-108C utilizing one or more devices 112A-112C. In some examples, the one or more devices 112A-112C may correspond to a tablet 112A, a smartphone 112B, and/or a client device 112C. As another non-limiting example, at least one client device 112A-112C may be any device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other Internet of Things (IOT) devices.

At each of the workloads 108A-108C, the user may have or otherwise interact with each of the workloads 108A-108C utilizing a user account. Continuing the previous example, a user 104 may utilize a first user account 116A at the first workload 108A to interact with the business service entity. The user 104 may utilize a second user account 116B to interact with the personal email provided by the personal email account service. The user 104 may utilize a third user account 116C to interact with LinkedIn.com. In general, user accounts 116A-116C may be specific to each workload 108A-108C, though they need not be.

Activity information associated with the first user account 116A, the second user account 116B, and the third user account 116C, may be shared with or otherwise accessible by the central activity tracking service 124. For example, once a user 104 is signed into, sometimes referred to as logged into, activity information associated with respective account at the one or more of the workloads 108A-108B, may be stored. That is, activity information associated with the first user account 116A, the second user account 116B, and/or the third user account 116C may be stored in the activity storage 136. The activity storage may include identification information indicating a user account and activity information for the user account as illustrated as last activity information 140. More specifically, the activity information may correspond to or otherwise indicate a last time at which the user 104 interacted with the account and/or the workload. That is, throughout the day, the user 104 may switch between interacting with the various workloads 108A-108B. The activity storage 136 may store or otherwise record the last time in which the user utilized or otherwise interacted with the workload and thus the respective account at the workload. In some instances, the activity storage 136, and therefore the last activity information 140, may reside at a location in the cloud, at a server, locally at one or more of the devices 112A-112C, for example as a cookie in a web browser session and/or a shared web browser session.

Alternatively, or in addition, each of the workloads 108A-108C may provide activity information to the central activity tracking service 124. For example, the first workload 108A may provide activity information for the first user account 116A corresponding to or otherwise associated with the user 104; the activity information may include an identifier associated with the first user account 116A. For example, the identifier associated with the first user account 116A may be a unique identifier that identifies the first user account 116A and/or a unique identifier that is associated with the user 104, for example a unique identifier identifying user 104. In addition, the activity information may include information identifying the first workload 108A. That is, the activity information may include an identifier uniquely identifying the first workload 108A. Thus, the activity information provided to the central activity tracking service may include, for example, user@domain.com and/or indicate that the user account is associated with the first workload 108A. In some instances, only information associated with a user and/or user account is provided to the central activity tracking service—in these instances knowledge of the specific workload may not be needed. Thus, the activity information may indicate, for example, that the user 104 and/or first user account 116A associated with the identifier user@domain.com is active on the first workload 108A. Each of the other workloads 108B-108C, may provide activity information for the user accounts 116B-116C as well.

In some instances, the central activity tracking service 124 may receive the activity information and store such activity information in the activity storage 136 as previously discussed. The activity storage 136 may be located in a same device, network location, or otherwise as the central activity tracking service 124. Alternatively, or in addition, the activity storage location may be located at a location different from and/or separate and apart from the central activity tracking service 124. For example, the central activity tracking service 124 may be located at or otherwise associate with a first cloud storage location and the activity storage 136 may be located at or otherwise associated with a second cloud storage location. As further depicted in FIG. 1, the activity information for each account may be logged. The activity information, as previously discussed, may include an identifier uniquely identifying the user account and/or the workload along with an indication, such as a timestamp, of last user activity.

Due to inactivity, user accounts at each of the workloads 108A-108C may be signed out, or logged out, if the user has not interacted with such workload in a specified period of time. For example, after fifteen minutes, three days, or two weeks of inactivity, a workload may sign out, or log out, the user from the workload. In accordance with examples of the present disclosure, prior to the workload signing the user 104 out of one of their accounts, the workload may request an activity check by the central activity tracking service 124 to determine if the user 104 has been active in any of their other accounts that may have been previously linked.

That is, a user 104 may control which accounts, and therefore which workloads, are linked together such that activity at one account, or workload, may be shared with another account, or workload. In accordance with some examples of the present disclosure, when a workload determines that it may be time to sign a user out of their account, for example when a user is inactive for a period time, prior to signing out a user, the workload may contact the central activity tracking service 124 to determine if the user has been active in any of the other linked user accounts. For example, a first workload 108A may make a request, or call, to the central activity tracking service 124 and may provide an identifier associated with the first user account 116A, for example the unique identifier identifying the first account 116A1, and/or an identifier associated with the user 104, to the central activity tracking service 124. The central activity tracking service 124 may then determine, based on the identifier provided from the first workload 108A, if the identifier is associated with other user accounts. For example, the central activity tracking service 124 may access account storage 128 and match the identifier received from the first workload 108A to one or more collections as depicted as account storage information 132, where each collection includes user accounts that are linked together or otherwise associated with one another and/or associated with the same user. Thus for example, the activities associated with the first user account 116A in a collection may be associated with a second different user account 116B in the same collection. Accordingly, the central activity tracking service 124 may then access the activity storage 136 and determine, for each of the accounts in a same collection, the last activity associated with each account and therefore the last activity of the collection.

That is, the central activity tracking service 124 may determine that at least one of the accounts associated with the user 104 is active or has been active within a certain amount of time and provide, to the first workload 108A that is making a determination as to whether or not to sign out the user 104, a response that indicates that at least one linked user account is active or has been active within a certain period of time. Therefore, the first workload 108A may determine that the user 104 is active, or has been active, in at least one account; based on such a determination, the first workload 108A may keep the user 104, or the user's account 116A, signed into the first workload 108A.

In accordance with some examples, suppose the user 104 is offline and has not interacted with any of the accounts 116A-116B on any of the workloads 108A-108C. Thus, when a workload, 108A for example, determines that it may be time to sign a user 104 out of their first user account 116A, for example when a user 104 is inactive for a period time, prior to signing out the user 104, the first workload 108A may contact the central activity tracking service 124 to determine if the user 104 has been active in any other of the user's linked accounts. For example, the central activity tracking service 124 may access account storage 128 and match the identifier received from the first workload 108A to one or more collections as depicted as account storage information 132, where each collection includes user accounts that are linked together or otherwise associated with one another and/or associated with the same user. Thus for example, the activities associated with the first user account 116A in a collection may be associated with a second different user account 116B in the same collection. Accordingly, the central activity tracking service 124 may access the activity storage 136 and determine, for each of the accounts in a same collection, the last activity associated with each account and therefore the last activity of the collection.

That is, the central activity tracking service 124 may determine that at least one of the accounts associated with the user 104 is not active or has not been active within a certain amount of time and provide, to the first workload 108A that is making a determination as to whether or not to sign out the user 104, a response that indicates that at least one linked user account is not active or has not been active within a certain period of time. Therefore, the first workload 108A may determine that the user 104 is not active, or has not been active within a certain time period in at least one account; based on such a determination, the first workload 108A may sign out, or log out, the user 104, or the user's account 116A, that was previously signed into the first workload 108A. In some instances, the central activity tracking service 124 may provide a timestamp indicating the time of the last activity; alternatively, or in addition, the central activity tracking service 124 may provide an amount of time between a current time and the time of the last activity.

Figure 2:
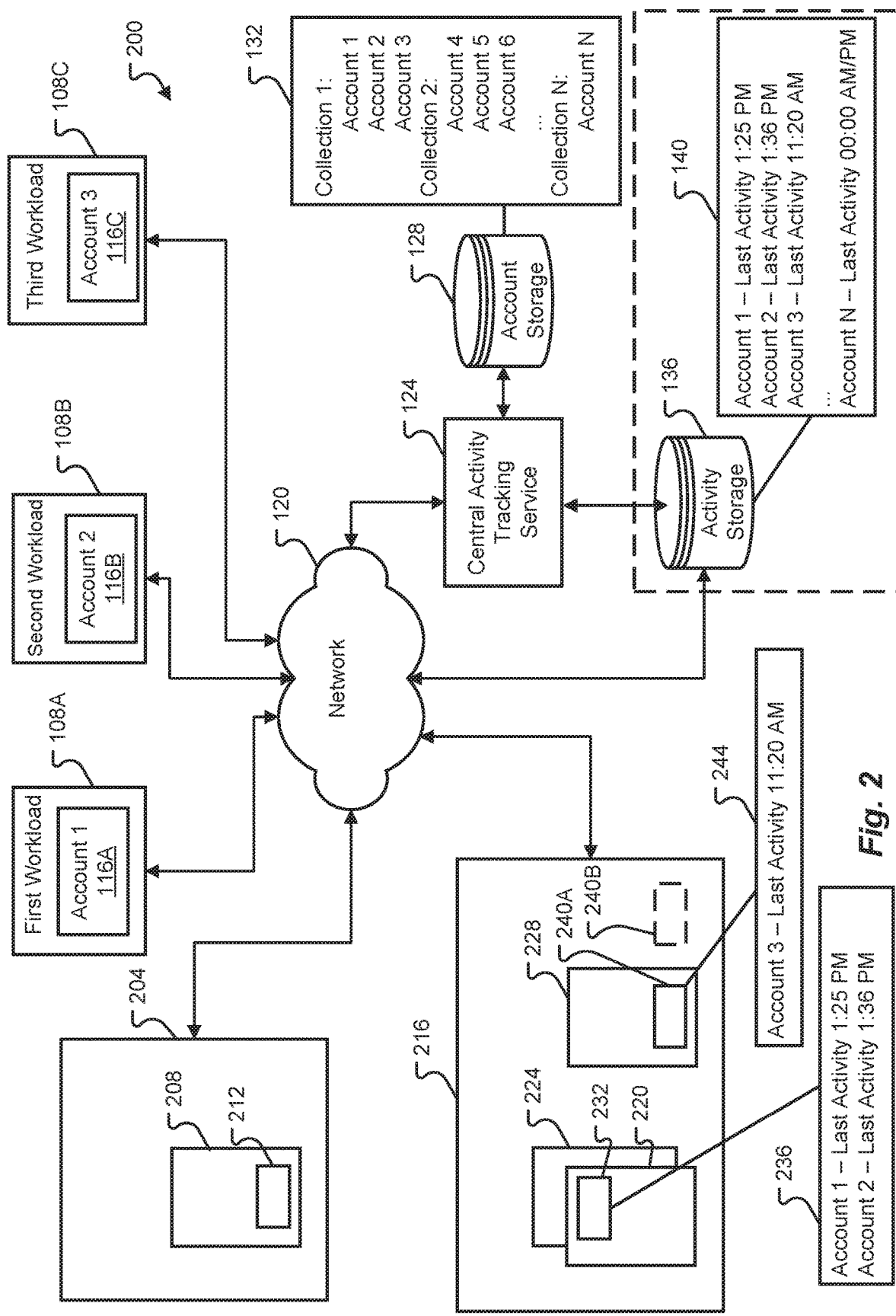
FIG. 2 depicts additional details of an account activity tracking system in accordance with the aspects a of the disclosure.

FIG. 2 depicts additional details of an account activity tracking system 200 in accordance with examples of the present disclosure. More specifically, the account activity tracking system 200 may be the same as or similar to the account activity tracking system 200; accordingly, descriptions of and/or operations related to reference characters of the account activity tracking system 200 may be the same as or similar to the descriptions of and/or operations related to reference characters of the account activity tracking system 100 and therefore are not explicitly repeated herein. As further depicted in the account activity tracking system 100, a first device, such as a device 204, may be the same as or similar to one or more of the devices 112A-112C. An application 208, such as a desktop application, web application, web browser etc., may be executed and/or executing on the device 112A-C; the application may include an area 212 for storing activity information associated with one or more accounts of the application 208. For example, the area 212 may correspond to one or more cookies in a web browser session and/or a shared web browser session. As further depicted in FIG. 2, the device 216, which may be the same as or similar to one or more of the devices 112A-112C, may execute one or more applications 224 and/or 228. The applications 224 and/or 228 may be a desktop application, mobile application, web application, and/or web browser application and may include respective activity storage locations 232 and 240A. In some instances, the storage locations 232, 240A, and/or 240B may be a cookie in a web browser session and/or a shared web browser session. As one example, a web browser may be executing two tabs, where one tab such as 220, corresponds to a first service entity, such as a first workload 108A, and another tab, such as tab 224 corresponds to a second service entity, such as a second workload 108B. Accordingly, a single application may be associated with two separate workloads. In some instances, the activity storage location 232 may include activity information 236 corresponding to each of the tabs 220 and 224. Alternatively, or in addition, a separate activity storage location may be associated with each of the tabs 220 and 224. As another example, an application 228 may be executing on the device 216; the application may store activity information 244 at the activity storage location 240A associated with the application 228. Alternatively, or in addition, an activity storage location, such as activity storage location 240B, may be separate and distinct from the application 228; rather the application 228 may access the activity storage location 240B to provide the activity information 244.

Figure 3:
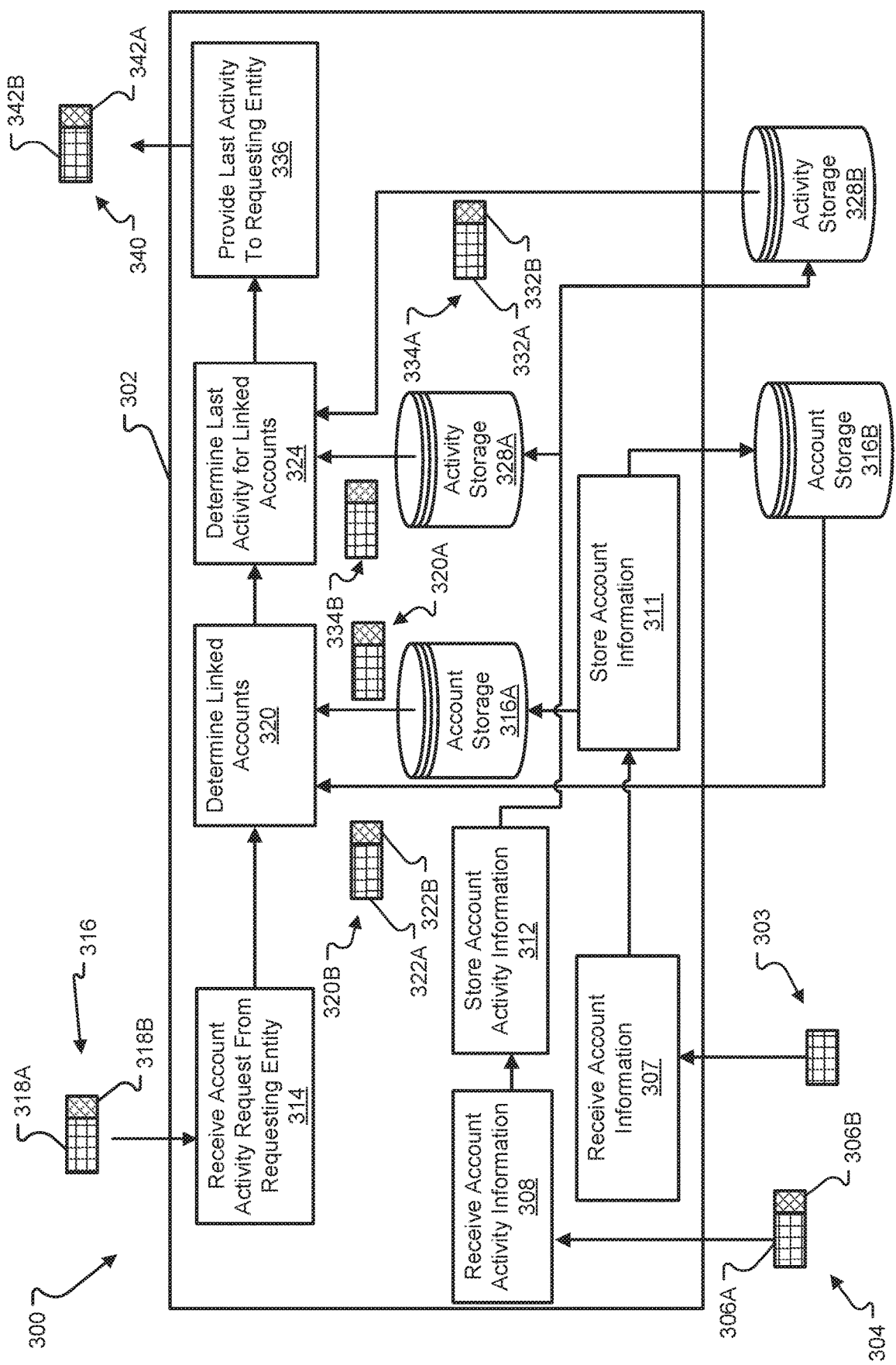
FIG. 3 depicts details of a central activity tracking service in accordance with examples of the present disclosure.

FIG. 3 depicts additional details of a central activity tracking service 302 in accordance with examples of the present disclosure. The central activity tracking service 302 may receive first information from an entity, such as a client device and/or a workload associated with a user account. In some instances, a web page and/or a portion of an application may include a script or other executable that may provide user activity information 304 associated with the user account to the central activity tracking service 302 for storage. As previously discussed however, the user activity information associated with the user account may be stored locally at the client device. The user activity information 304 provided by the client device and/or a workload associated with a user account may include a first portion 306A corresponding to a user identifier, user account, workload identifier, and/or workload account. The user activity information 304 provided by the client device and/or a workload associated with a user account may include a second portion 306B corresponding to a time at which the user associated with the user account was last active. Accordingly, at 308, the central activity tracking service 302 may receive the user activity information 304 and proceed to store the user account activity information at 308 in an account storage 316A located at the central activity tracking service 302 and/or at account storage 316B located at a location other than the central activity tracking service 302. Although the receiving of the account activity information at 308 and storing of the account activity information at 312 is depicted as being part of the central activity tracking service 302, such action and/or features may occur at a different device such as a device that is different from the central activity tracking service 302.

The central activity tracking service 302 may receive account linking information 303 from an entity, such as a client device and/or a workload associated with a user account. For example, a user may provide account linking information 303 from an interface as will be described with respect to FIG. 5. As previously discussed, the account linking information 303 may be received at 307 of the central activity tracking service 302 and stored at 311 at the account storage 316A and/or 316B, where the account storage 316B may be located separate and apart from the central activity tracking service 302. Although the receiving of the account linking information 303 at 307 and storing of the account linking information 303 at 311 is depicted as being part of the central activity tracking service 302, such action and/or features may occur at a different device such as a device that is different from the central activity tracking service 302.

As further depicted in FIG. 3, the central activity tracking service 302 may receive a request, or first message 316, at 314 from an entity inquiring as to whether another user account associated with the received user account has been active. For example, at 314, the central activity tracking service 302 may receive a first message 316 including a first portion 318A that includes an account, user, and/or workload identifier of interest and a second portion 318B that may include authentication information which authenticates a workload with the central activity tracking service 302. The central activity tracking service 302 may then determine if any linked accounts exist at 320 and further determine a last activity time associated with the one or more linked accounts. For example, the account storage 316A and/or 316B may be accessed to determine if accounts linked or otherwise associated with the account received at 314 have been active and/or determine a last activity time associated with each of the accounts. In some instances, the account storage 316A and/or 316B may provide other account 322A and/or account identifiers and/or a collection identifier 322B in a message 320A and/or 320B that are associated with the user account and/or user identifier received at 314. The account storage 316A may reside locally at the central activity tracking service 302, in some examples, the account storage 316B may reside at a location different from the central activity tracking service 302. For example, the central activity tracking service 302 may initiate a call, such as a web call, to one or more account storage locations that that maintain or otherwise include account linkage information.

At 324, the central activity tracking service 302 may determine a last activity associated with the retrieved accounts 322A and/or a collection identifier 322B. For example, the central activity tracking service 302 may initiate a request and/or a call to one or more of the activity storage locations 328A and/or 328B. The activity storage locations 328A and/or 328B may receive the request and provide a last activity time for each of, and/or for the group of, the user accounts, user identifiers, and/or collection. For example, a first user account may have been last active at 1:25 PM while a third user account may have been last active at 11:20 AM. In accordance with some examples, the activity storage location 328A and/or 328B may provide a last activity time such as 11:20 AM in a message 334A and/or 334B. In other examples, the message 334A and/or 334B may include whether the last activity time exceeds a defined threshold, such as thirty minutes form a current time for example. Thus, the message 334A and/or 324B may include a Boolean value indicating yes or no and/or one or zero for example. In some instances, the message 334A and/or 334B may include a last activity time in a first portion 332A and the Boolean operation in the second portion 332B. Accordingly, the central activity tracking service 302 may then provide the activity information retrieved from the activity storage location 328A and/or 328B to the requesting entity at 336. For example, the central activity tracking service 302 may send a message 340 including first portion 342A including a user account and/or user identifier associated with the first message 316 received at 314 and/or a second portion 342B that includes a last activity time portion, where the last activity time portion may include an actual time of the latest activity for one or more user accounts linked to the user account and/or user identifier received at 314, and/or a determination as to whether the last activity for the one or more user accounts linked to the user account and/or user identifier received at 314 exceeds a threshold.

Figure 4:
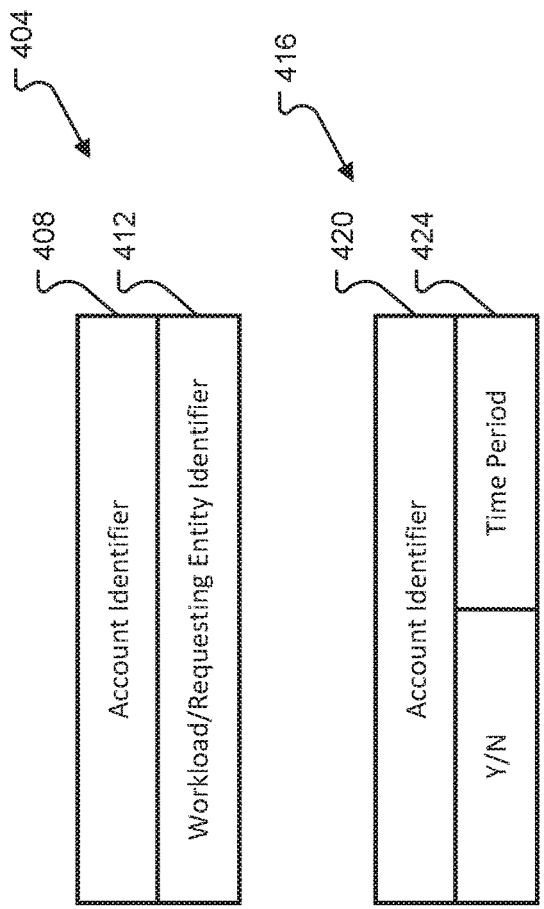
FIG. 4 depicts example data structures in accordance with examples of the present disclosure.

FIG. 4 depicts a first data structure 404 and a second data structure 416 in accordance with examples of the present disclosure. The first data structure 404 may correspond to information in a first message, such as first message 316 that includes an account identifier portion 408 and a workload identifier/requesting entity identifier portion 412. As previously discussed, the account identifier 408 may correspond to or otherwise identify a user account and/or a user for which a service entity, or workload, is attempting to make a determination as to whether or not to sign out, or log out. The second data structure 416 may correspond to information provided by the central activity tracking service to the requesting entity in a second message. For example, the second data structure 416 may include an account identifier portion 420 which may identify a user utilizing a user identifier, an account identifier, and/or a workload; the account identifier portion 420 may include information such as the account identifier in the account identifier portion 408 and a workload identifier/requesting entity identifier in the workload identifier/requesting entity identifier portion 412. The second data structure 416 may include an activity portion 424 indicating a last activity of the user and/or account identified in the account identifier portion 420 and/or whether the last activity of the user and/or account identified in the account identifier portion 420 exceeded a threshold amount of time. In some examples, the requesting entity may include an activity threshold in the first message and the central activity tracking service may provide an indication as to whether or not the last activity of the user and/or account identified in the account identifier portion 420 exceeds the activity threshold or is within the activity threshold.

Figure 5A:
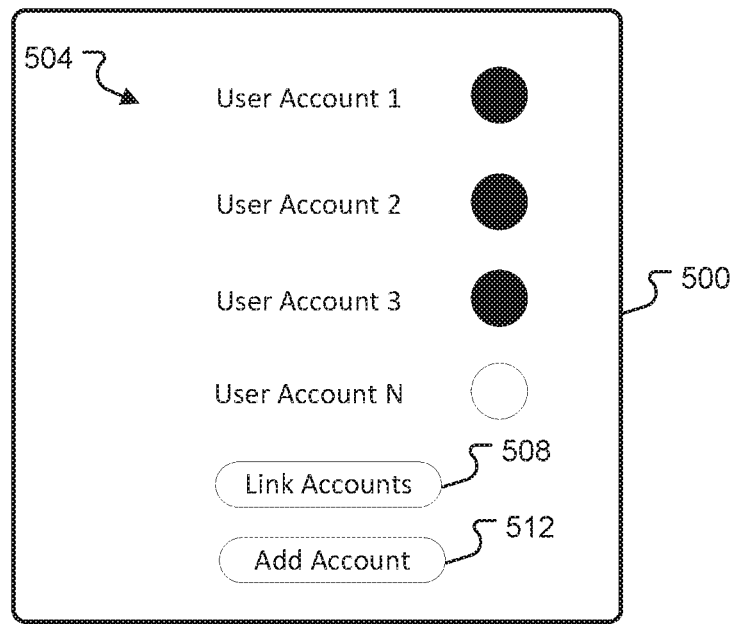
FIGS. 5A-5B depicts an example user interface for linking one or more user accounts in accordance with examples of the present disclosure.
Figure 5B:
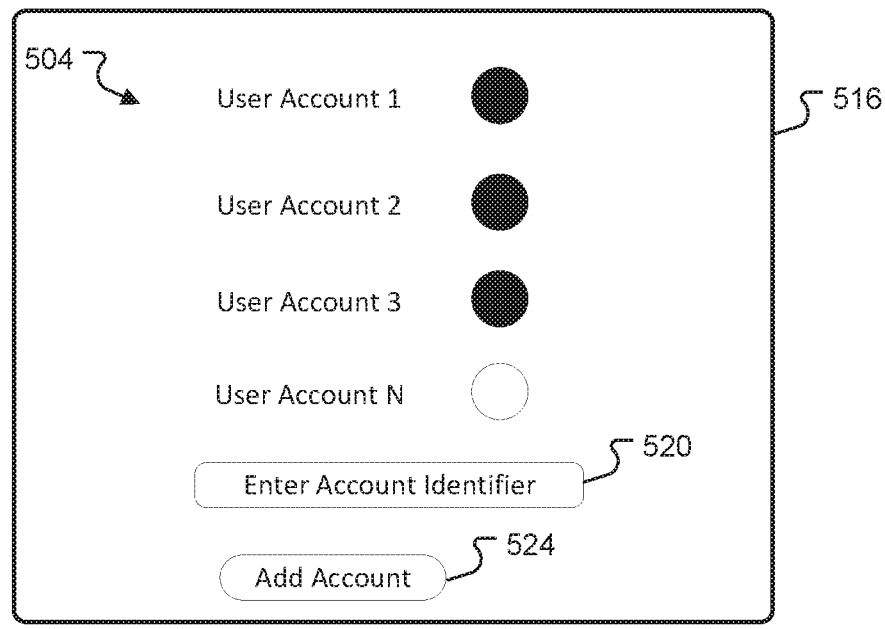

FIGS. 5A and 5B depict example windows, displays, or user interfaces 500 displayed to a user allowing a user to link one or more accounts and/or form one or more collections previously described with respect to FIG. 1 and FIG. 2. More specifically, a user interface 500 may be displayed to a user and allow a user to select one or more accounts 504 to link together. The user accounts displayed in the user interface 500 may represent a collection of user accounts corresponding to the user stored at the account storage 128/316A/316B as previously described.

That is, the linked user accounts stored at the account storage 128/316A/316B may be accessed, pulled, or otherwise formatted to be displayed to a user at the user interface 500. A user may select specific accounts to link and select an input 508, such as a link accounts input, to store or otherwise update the information representing the collection of user accounts corresponding to the user stored at the account storage 128/316A/316B. If, for example, a user would like to link another user account, the user may select an input 512 to enter additional account identification information in an input 520 presented in the user interface 516. Accordingly, once an account identifier, such as an email address, user id, or the like, is entered into the input 520, a user may select the account input 524 to add the user account to the list of available user accounts to link as displayed in the user interface 500. The user may select the new account to link to the existing accounts and select an input 508, such as a link accounts input, to store or otherwise update the information representing the collection of user accounts corresponding to the user stored at the account storage 128/316A/316B.

Figure 6:
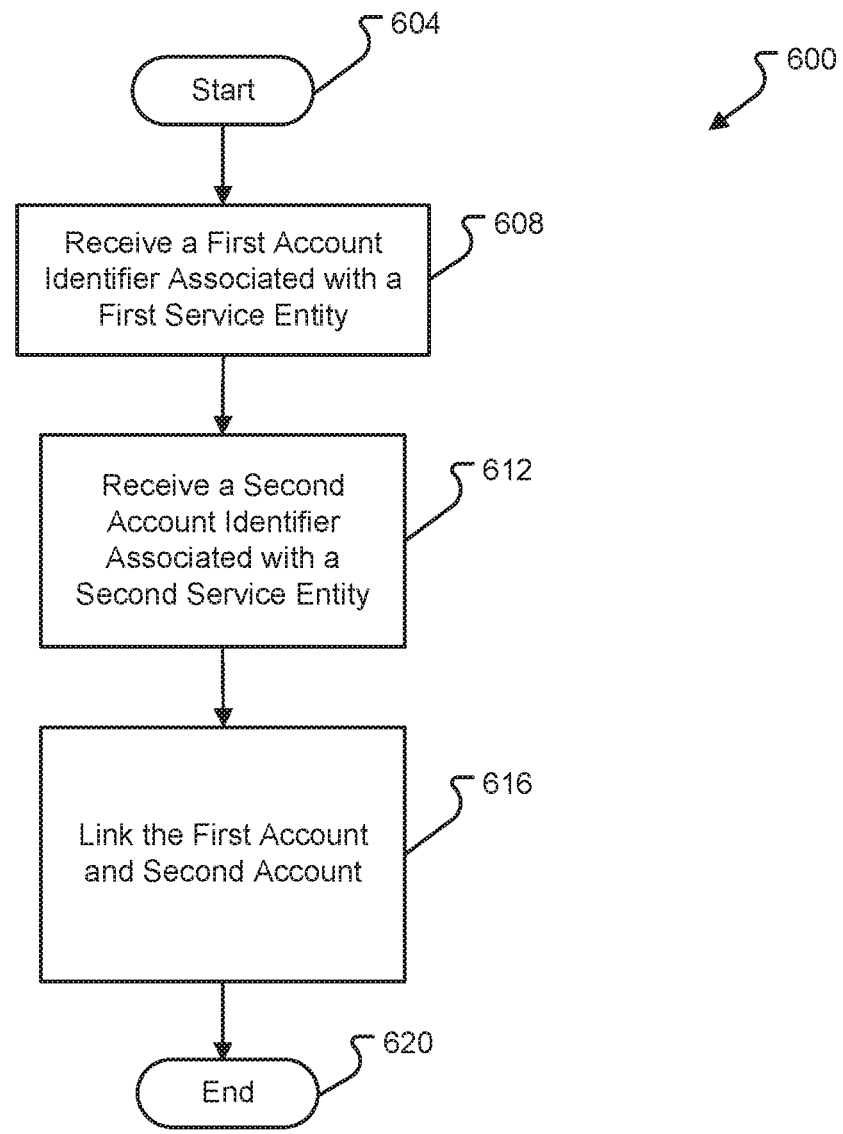
FIG. 6 depicts details of a method for linking accounts associated with different service entities in accordance with examples of the present disclosure.

FIG. 6 depicts details of a method 600 for linking a first account with a second account in accordance with examples of the present disclosure. A general order for the steps of the method 600 is shown in FIG. 6. Generally, the method 600 starts with a start operation 604 and ends with the end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method 600 starts at 604 and proceeds to 608 where a first account identifier associated with a first service entity, or workload, may be received. For example, a user may enter a first account identifier, for example at the user interface 516 and select the add account input 524. The first account identifier may then be sent or otherwise transmitted to the central activity tracking service 124/302 for storage in the account storage 128. In some examples, the first account identifier may be sent or otherwise transmitted to an account storage external to the central activity tracking service, such as account storage 316B. The method may proceed to 612 where a second account identifier associated with a second service entity, or second workload, may be received. In some instances, the second account identifier is for a second service entity that is different from the first service entity; in other examples, the second account identifier is for a second service entity that is the same as the first service entity. A user may enter a second account identifier, for example at the user interface 516 and select the add account input 524. The second account identifier may then be sent or otherwise transmitted to the central activity tracking service 124/302 for storage in the account storage 128. In some examples, the second account identifier may be sent or otherwise transmitted to an account storage external to the central activity tracking service, such as account storage 316B. The method may proceed to 616 where the first account identifier and the second account identifier may be linked. For example, the first account identifier and the second account identifier may be stored in the same collection, point to the same unique identifier which identifies or otherwise is associated with a collection of account identifiers, and/or linked or otherwise associated with one another in some other manner. The method 600 may end at 620.

Figure 7:
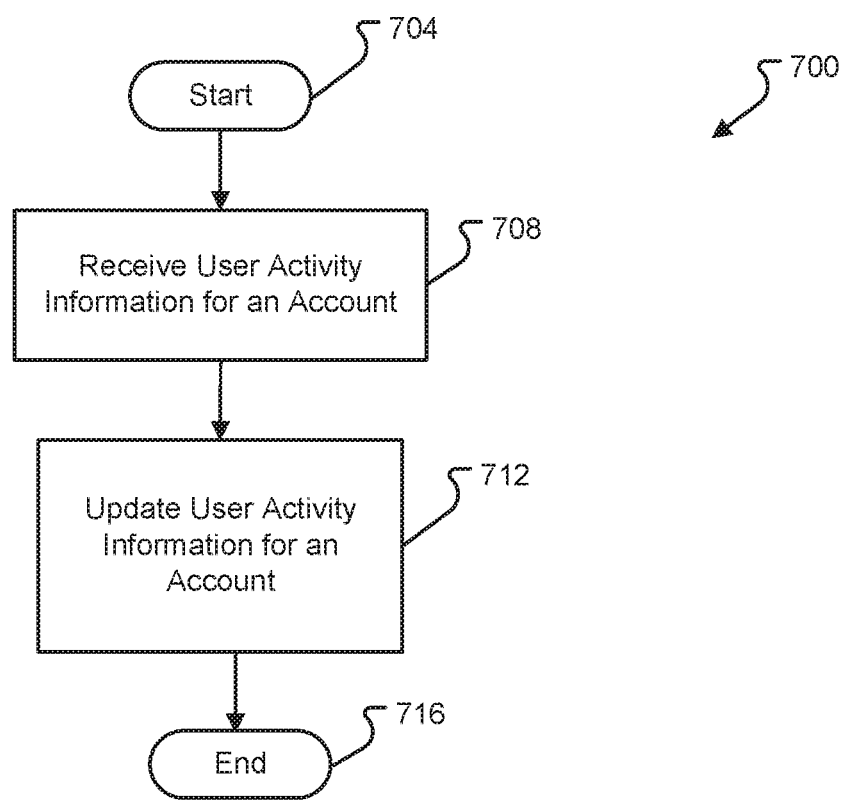
FIG. 7 depicts details of a method for receiving and/or updating user activity associated with an account in accordance with examples of the present disclosure.

FIG. 7 depicts details of a method 700 for updating user activity information for a user account in accordance with examples of the present disclosure. A general order for the steps of the method 700 is shown in FIG. 7. Generally, the method 700 starts with a start operation 704 and ends with the end operation 716. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method 700 starts at 704 and proceeds to 708 where activity information associated with a first account identifier for service entity, or workload, is received. In some examples, the activity information may originate from the service entity, or workload. Alternatively, or in addition, the activity information may originate from a client, or application, such as but not limited to a web browser, that is in communication with or otherwise interacting with the service entity, or workload. As one example, a web browser may be interacting with a web hosted service, such as email. The web browser may store activity information locally, provide activity information to the central activity tracking service, and/or provide activity information to a storage location external to the device at which the web browser is executed and/or the central activity tracking service. For example, a web browser may store the activity information at the activity storage location 232 and/or provide or otherwise transmit the activity information to one or more of the activity storage 136/328A/328B. The method 700 may proceed to 712 where the activity information associated with the user account and/or service entity is updated. For example, at the activity storage 233 and/or one or more of the activity storage 136/328A/328B, the last activity associated with the specified user account may be stored. That is, if the user was last active at 1:45 PM EST, an identifier corresponding to the last activity time of 1:45 PM EST would be stored and associated with the specified user account; if the user was subsequently active at 2:40 PM EST, an identifier corresponding to the last activity time of 2:40 PM EST would be stored and associated with the specified user account, thereby replacing the last activity time of 1:45 PM EST.

In some instances, a collection associated with the user account and/or service entity may be updated. For example, a collection including a plurality of user account may be associated with a last activity time. That is, an identifier associated with multiple user accounts may be updated with a last activity time and/or each of the user accounts within a collection may be updated with a last activity time. Moreover, a collection need not be limited to a single user but may be shared among a plurality of individual accounts. For example, a collection may include accounts belonging to members of a family or other group. Accordingly, a last activity time of a first user may be associated with a last activity time of a second user. Thus, as long as one of the accounts associated with one or more of the members of the family or other group remains active, then multiple different and distinct user accounts belonging to or otherwise associated with different users may remain logged in.

Figure 8:
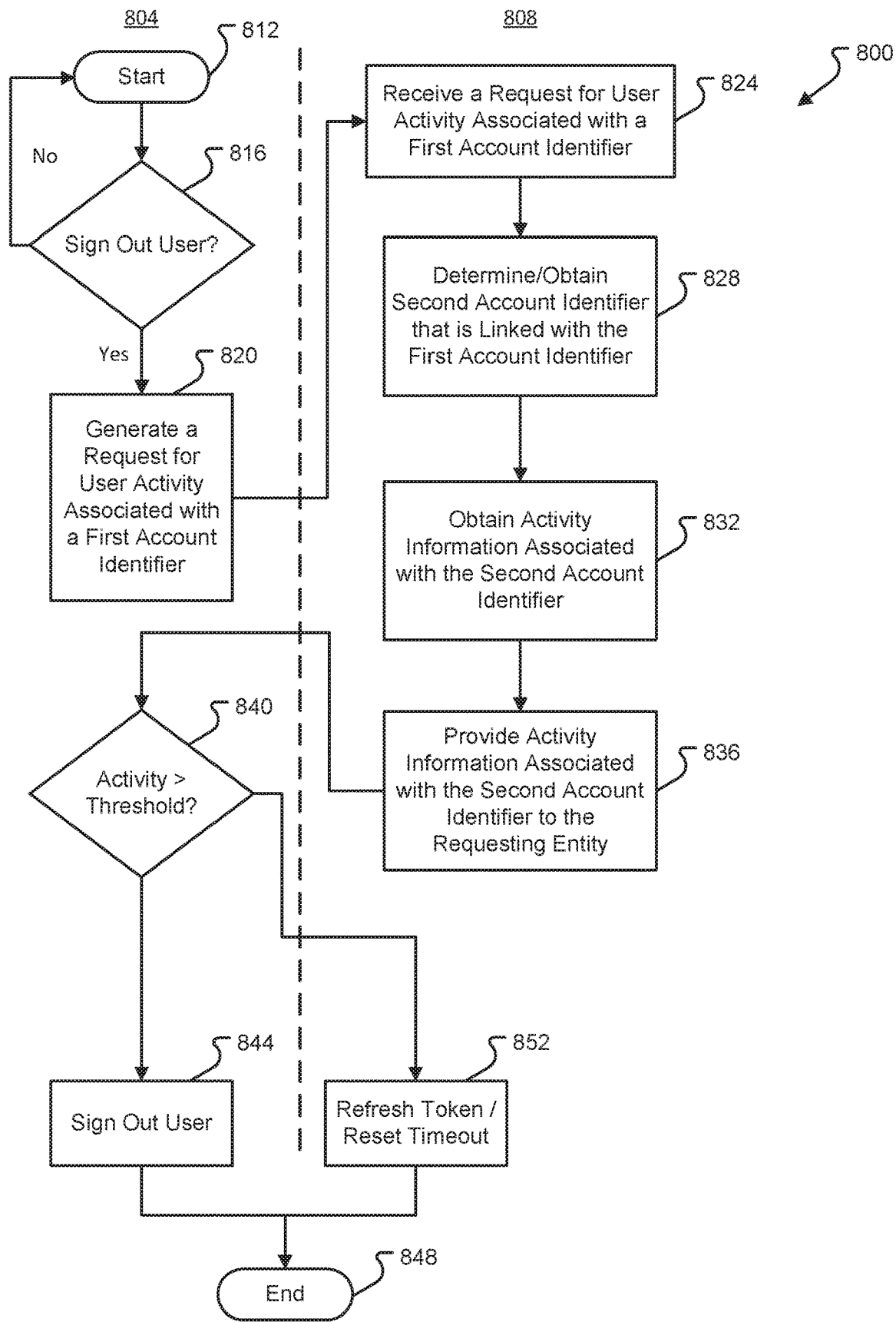
FIG. 8 depicts details of a method for determining whether to sign out a user in accordance with examples of the present disclosure.

FIG. 8 depicts details of a method 800 for determining if a user should be signed out or logged out based on a last activity of a plurality of user accounts. A general order for the steps of the method 800 is shown in FIG. 8. Generally, the method 800 starts with a start operation 812 and ends with the end operation 848. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with one or more processors, Application Specific Integrated Circuits (ASIC), one or more field programmable gate arrays (FPGA), one or more system on chips (SOC), or other hardware devices. Hereinafter, the method 800 shall be explained with reference to the systems, modules, software, data structures, user interfaces, etc. described in conjunction with FIGS. 1-7.

The method 800 starts at 812 and proceeds to 816 where a determination may be needed as to whether or not to sign out a user that is currently signed into a service entity with a user account. If a user has been active with a workload, for example the first workload 108A, within an amount of time corresponding to a first time threshold, the service entity may determine that the user account should not be signed out and may return to 812. In some instances, a requesting service entity 804 may be the same as or similar to the first workload 108A. If a first expiry of a first timed threshold associated with a user account, such as the first user account 116A, has occurred, the service entity, such as the first workload 108A, may determine if another user account associated with or otherwise linked to the first user account 116A, has been active within a certain period of time. Accordingly, the service entity may generate a request for user activity at 820, where the request for user activity may be a request for last active time for accounts linked to or otherwise associated with a first user account, such as 116A, where the first user account may be associated with a first account identifier, such as a unique number, email address, or other information that identifies a user account. In some instances, the request for user activity may include information in the first data structure 404.

The request may be sent to or otherwise transmitted to the central activity tracking service 808, which may be same as or similar to the central activity tracking service 124 and/or 302 previously described. The central activity tracking service 808 may receive the request for a last active time associated with the first user account and/or first account identifier at 824 and determine or otherwise identify a second account or second account identifier that may be associated with the received first account or first account identifier. For example, the central activity tracking service 808 may access account storage, such as account storage 128/316A/316B and match the identifier received from the service entity 804 to one or more collections as depicted as account storage information 132, where each collection includes user accounts that are linked together or otherwise associated with one another and/or associated with the same user. Thus for example, the activities associated with the first user account 116A in a collection may be associated with a second different user account 116B in the same collection. At 832, the central activity tracking service 808 may then access the activity storage 136/328A/328B and determine, for each of the accounts in a same collection, the last activity associated with each account and therefore the last activity of the collection. That is, the central activity tracking service 124/302/808 may determine that at least one of the accounts associated with a user, such as user 104, is active or has been active within a certain amount of time and provide, to the service entity or workload 108A/804 that is making a determination as to whether or not to sign out the user account. At 836, the central activity tracking service 124/302/808 may then provide the last activity information associated with an account different than the account identified in the received request at 824 to the requesting service entity 108A/804. Accordingly, the requesting service entity 108A/804 may determine if the last activity is greater than a threshold and if so, may sign out the user at 844. If the last activity is not greater than a threshold, but rather less than a threshold, the requesting service entity 108A/804 may cause the user to stay signed in at 852 by, for example, refreshing a security token or resetting a timeout period associated with the first account identifier (e.g., the first user account). The method 800 may then end at 848.

Figure 9:
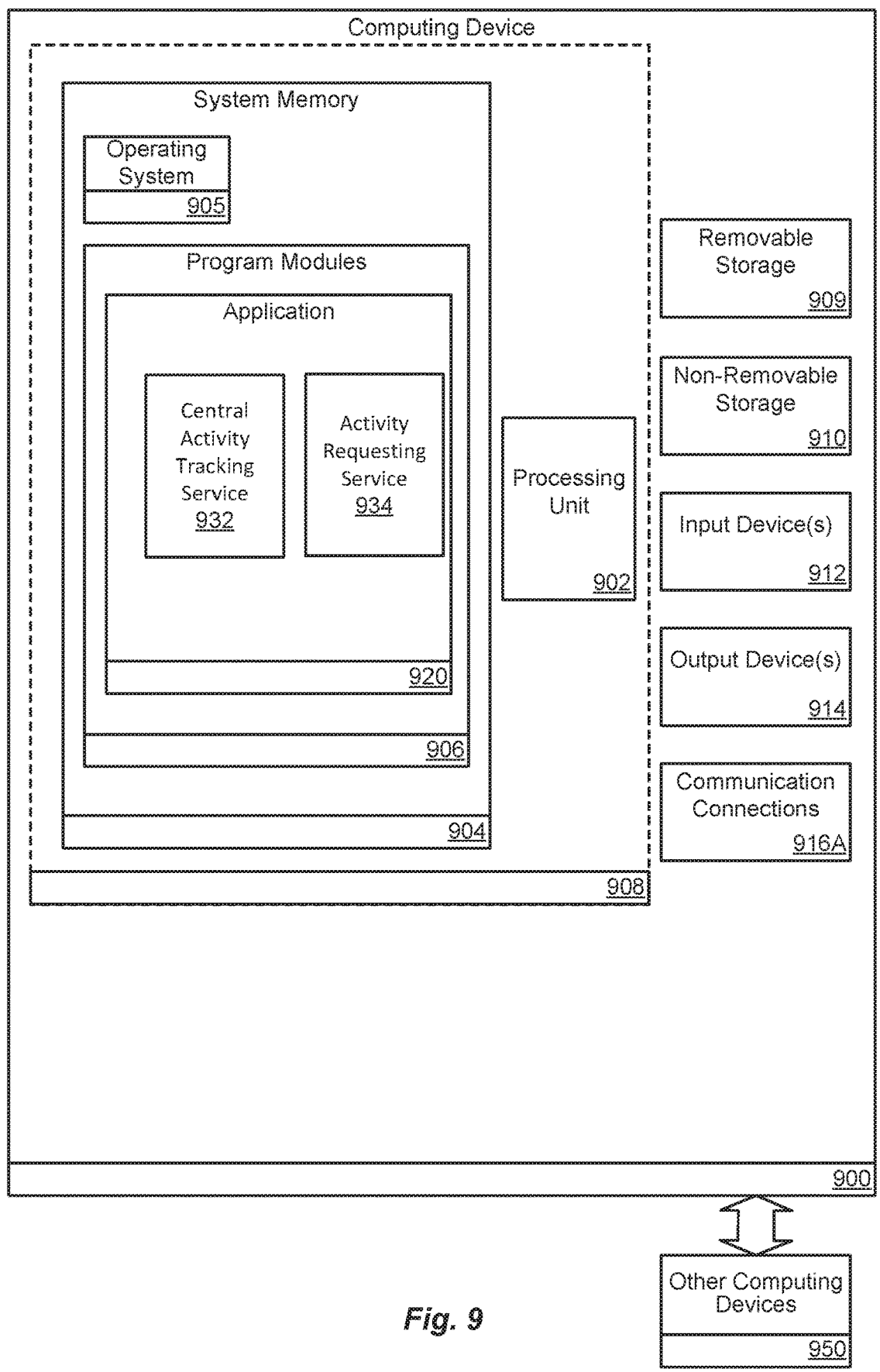
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices, such as the device 112A-C, the workloads 108A-108C/804, and/or the central activity tracking service 124/302/808, as described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for performing the various aspects disclosed herein such as the central activity tracking service 932 and/or an activity requesting service 934. The operating system 905, for example, may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., one or more applications 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916A allowing communications with other computing devices 950. Examples of suitable communication connections 916A include, but are not limited to, radio frequency (RF) transmitter, receiver, and/or transceiver circuitry; universal serial bus (USB), parallel, network interface card, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
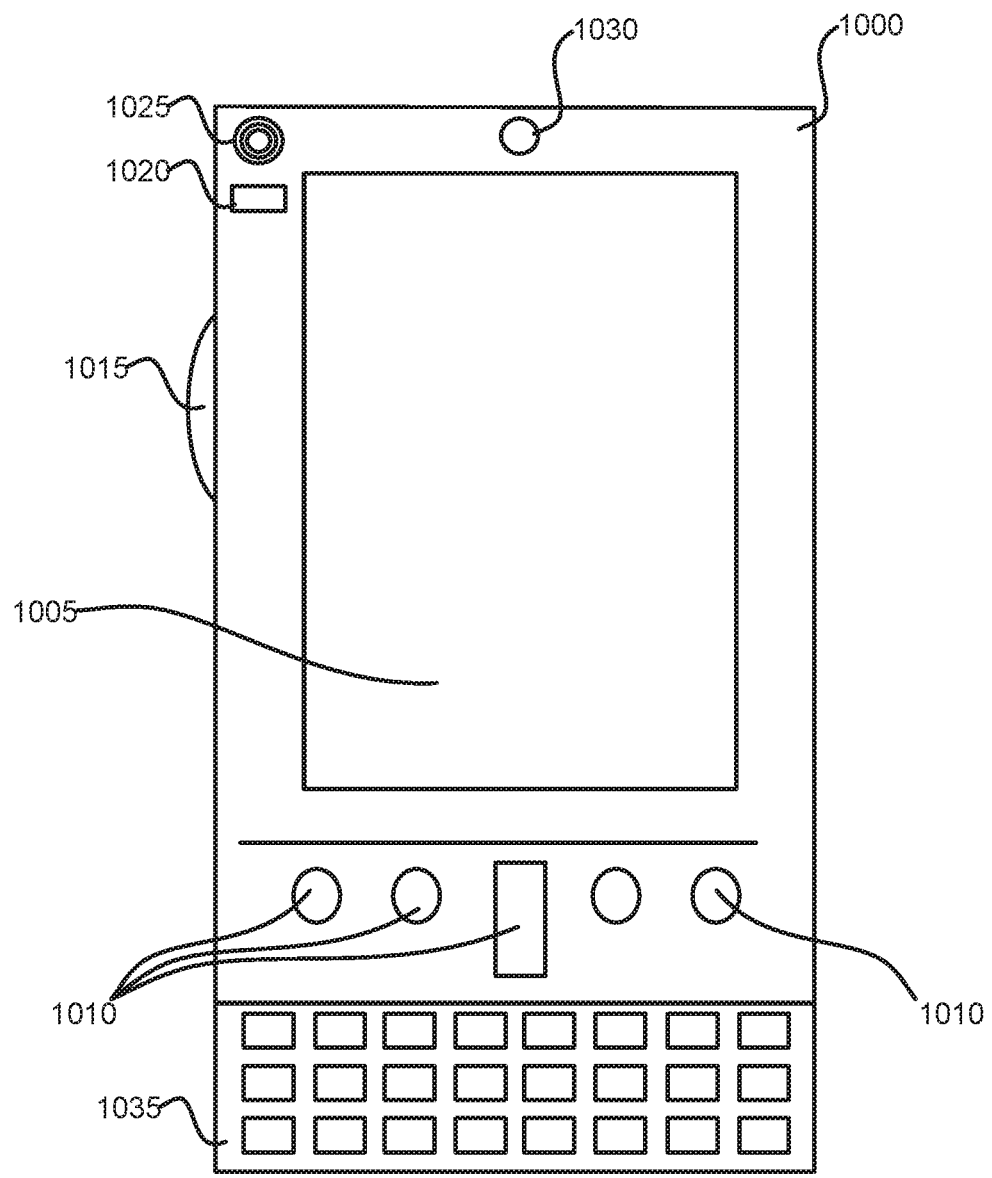
FIG. 10A is a simplified block diagram of a computing device with which aspects of the present disclosure may be practiced.
Figure 10B:
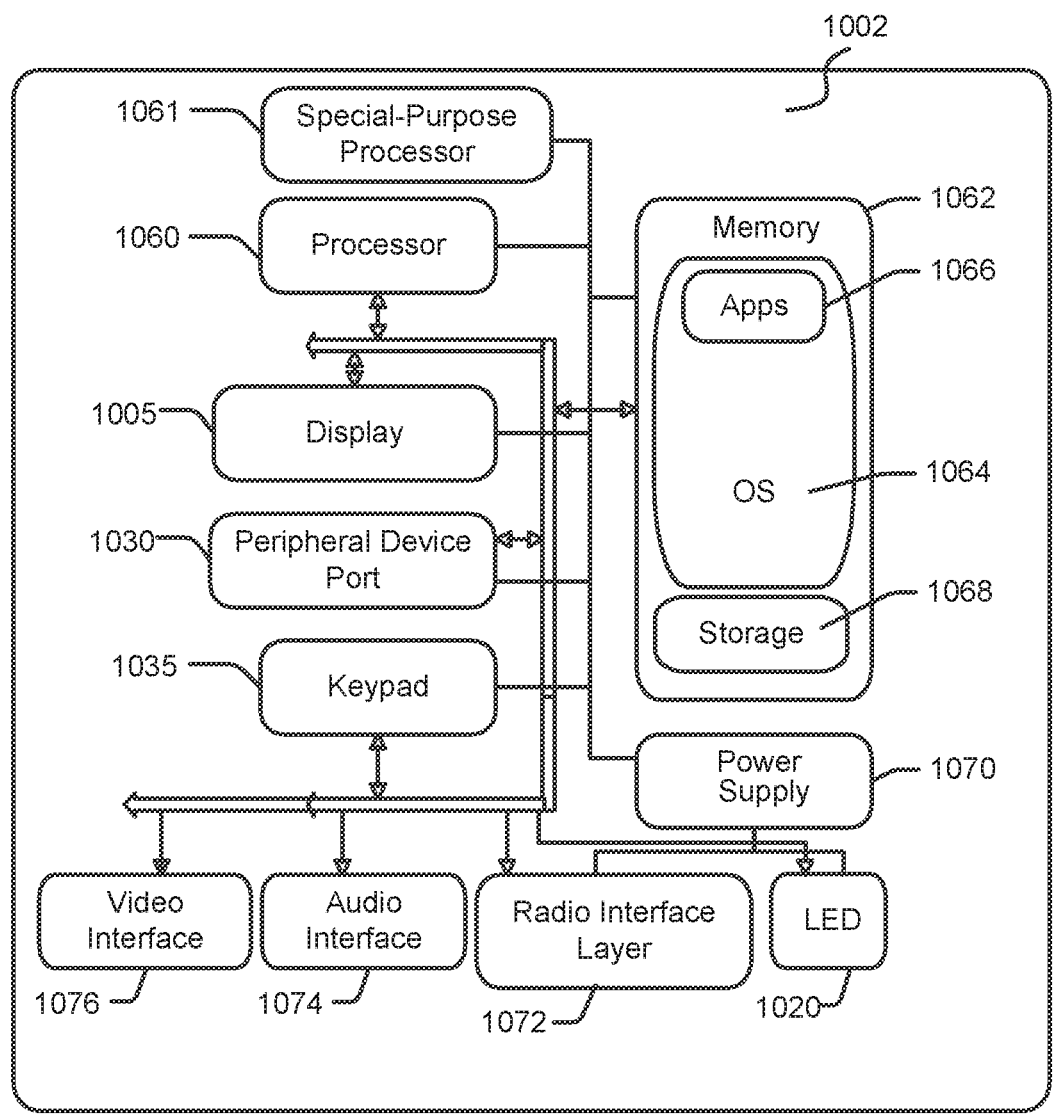
FIG. 10B is another are simplified block diagram of a mobile computing device with which aspects of the present disclosure may be practiced.

FIGS. 10A and 10B illustrate a computing device, client device, or mobile computing device 1000, for example, a mobile telephone, a smart phone, wearable computer (such as a smart watch), a tablet computer, a laptop computer, and the like, with which aspects of the disclosure may be practiced. In some aspects, the client device (e.g., 112A-112C) may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some aspects. In yet another alternative aspect, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external source.

FIG. 10B is a block diagram illustrating the architecture of one aspect of computing device, a server, or a mobile computing device. That is, the mobile computing device 1000 can incorporate a system (e.g., an architecture) 1002 to implement some aspects. The system 1002 can implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, lead nurturing programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, last activity time associated with the application and/or user account, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated configuration, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
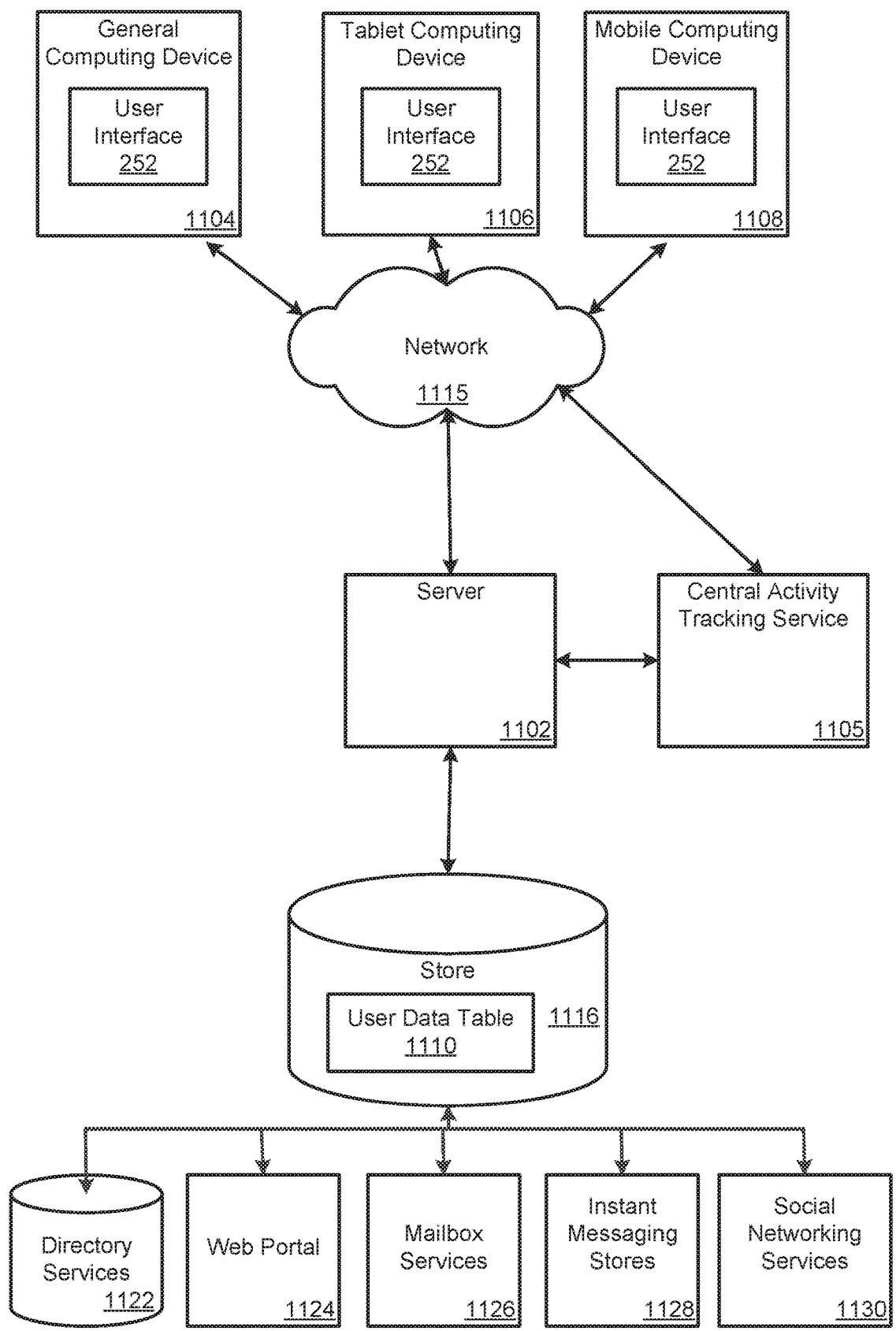
FIG. 11 is a simplified block diagram of a distributed computing system in which aspects of the present disclosure may be practiced.

FIG. 11 illustrates one aspect of the architecture of a system for processing data received at a server device 1102 (e.g., workload 108A-108C) from a remote source, as described above. Content at a server device 1102 may be stored in different communication channels or other storage types. For example, various images, or files may be stored using a directory service 1122, a web portal 1124, a mailbox service 1126, an instant messaging store 1128, or a social networking site 1130. A unified profile API based on the user data table 1110 may be employed by a client that communicates with server device 1102. The server device 1102 may provide data to and from a client computing device such as the client devices 1104, 1106, and/or 1108 (e.g., 112A-112C) through a network 1115. By way of example, at least one of the devices 112A-112C described above may be embodied in a personal computer 1104, a tablet computing device 1106, and/or a mobile computing device 1108 (e.g., a smart phone). Each of the personal computer 1104, the tablet computing device 1106, and/or the mobile computing device 1108 (e.g., a smart phone) may display a user interface 252, which may allow a user to link accounts, such as user interfaces 500 and 516. Moreover, the system for processing data may also include the central activity tracking service 1105 which may interact with or otherwise communicate with one or more of the personal computer 1104, the tablet computing device 1106, the mobile computing device 1108 (e.g., a smart phone), and/or the server device 1102.

The above specification, examples and data provide a complete description of the manufacture and use of the composition of the invention. Since many aspects of the invention can be made without departing from the spirit and scope of the invention, the invention resides in the claims hereinafter appended.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions that may be implemented with particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In accordance with at least one example of the present disclosure, an account activity tracking system is provided. The account activity tracking system may include at least one processor and at least one memory including instructions which when executed by the at least one processor, causes the at least one processor to receive, from an entity, an activity request including a first identifier associated with a first user account, based on the first identifier associated with the first user account, retrieve a second identifier associated with a second user account, wherein the first identifier and the second identifier are linked to one another, obtain activity information for the second identifier associated with the second user account, and cause the activity information to be provided to the entity.

At least one aspect of the above example includes one or more instructions, which when executed by the at least one processor, causes the at least one processor to determine a most recent interactive session occurring between the second user account and a second entity, where the activity information to be provided to the entity includes information indicating when the most recent interactive session occurred between the second user account and the second entity. At least one aspect of the above example includes one or more instructions, which when executed by the at least one processor, causes the at least one processor to determine if a most recent interactive session occurring between the second user account and a second entity occurred within a period of time, wherein the activity information to be provided to the entity includes a binary value based on the determination. At least one aspect of the above example includes where the first user account is associated with the entity and the second user account is associated with a second entity different from and physically distinct from the entity. At least one aspect of the above example includes one or more instructions, which when executed by the at least one processor, causes the at least one processor to retrieve a collection of user accounts linked to the identifier associated with the first user account, the collection of user accounts including a plurality of user accounts for a plurality of respective different entities, retrieve a most recent interactive session occurring between each user account of the plurality of user accounts and each respective different entity of the plurality of respective different entities, and obtain the activity information for the second identifier associated with the second user account, wherein the activity information for the second identifier associated with the second user account is a most recent interaction amongst each user account of the plurality of user accounts and each respective different entity of the plurality of respective different entities. At least one aspect of the above example includes where the first user account and the second user account are for a same user. At least one aspect of the above example includes where the first user account is associated with the entity and the second user account is associated with a second entity different from the entity. At least one aspect of the above example includes one or more instructions, which when executed by the at least one processor, causes the at least one processor to generate a request, based on the first identifier associated with the first user account, information for one or more identifiers linked to the first identifier, provide the request to a second entity, and receive the second identifier associated with the second user account. At least one aspect of the above example includes one or more instructions, which when executed by the at least one processor, causes the at least one processor to generate a request, based on the second identifier, information for interactive session information occurring between the second user account and a second entity, provide the request to a third entity, and receive the interactive session information associated with the second user account and the second entity. At least one aspect of the above example includes where the interactive session information is stored in a cookie.

In accordance with at least one example of the present disclosure, a method is provided. The method may include receiving, from an entity, an activity request including a first identifier associated with a first user account, based on the first identifier associated with the first user account, retrieving a second identifier associated with a second user account, wherein the first identifier and the second identifier are linked to one another, obtaining activity information for the second identifier associated with the second user account, and causing the activity information to be provided to the entity.

In accordance with at least one aspect of the above example, the method may include signing out the first user account from the entity if the activity information indicates that a most recent interactive session between the second user account and a second entity occurred more than a threshold time duration from a first time. In accordance with at least one aspect of the above example, the first time may correspond to a most recent interactive session between the first user and the first user account. In accordance with at least one aspect of the above example, the first time may correspond to a sign-in event occurring between the first user and the first user account. In accordance with at least one aspect of the above example, the first user account may be associated with the entity and the second user account may be associated with a second entity different from and physically distinct from the entity. In accordance with at least one aspect of the above example, the method may include retrieving a collection of user accounts linked to the identifier associated with the first user account, the collection of user accounts including a plurality of user accounts for a plurality of respective different entities, retrieving a most recent interactive session occurring between each user account of the plurality of user accounts and each respective different entity of the plurality of respective different entities, and obtaining the activity information for the second identifier associated with the second user account, wherein the activity information for the second identifier associated with the second user account is a most recent interaction amongst each user account of the plurality of user accounts and each respective different entity of the plurality of respective different entities. In accordance with at least one aspect of the above example, the first user account and the second user account are for a same user. In accordance with at least one aspect of the above example, the first user account is associated with the entity and the second user account is associated with a second entity different from the entity.

In accordance with at least one example of the present disclosure, a computer-readable storage medium including instructions is provided. The instructions, when executed by at least one processor, cause the at least one processor to generate, at a first entity, a first message including a first identifier associated with a first user account, provide the first message to a second entity, receive from the second entity, a second message including an indication of activity for a second identifier associated with a second user account, sign out the first user account from the first entity based on the received indication of activity. In accordance with at least one aspect of the above example, the first user account and the second user account are for a same user.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. An account activity tracking system comprising:
at least one processor; and
at least one memory including instructions which when executed by the at least one processor, causes the account activity tracking system to:
receive a plurality of user accounts associated with a plurality of service entities to be linked to one another, the plurality of user accounts including at least a first user account associated with a first service entity and a second user account associated with a second service entity;
to establish a link between the plurality of user accounts, store an identifier for each of the plurality of user accounts within a collection at an account storage area associated with the account activity tracking system;
receive, from the plurality of service entities, activity information associated with the plurality of user accounts;
store the activity information in association with the identifier for each of the plurality of user accounts at an activity storage area associated with the account activity tracking system;
receive, from the first service entity, an activity request including a first identifier associated with the first user account;
based on the first identifier associated with the first user account, retrieve at least a second identifier associated with the second user account from the collection at the account storage area;
use the second identifier to obtain activity information associated with the second user account from the activity storage area; and
cause the activity information associated with the second user account to be provided to the first service entity.

2. The system of claim 1, further comprising one or more instructions, which when executed by the at least one processor, causes the account activity tracking system to:
determine a most recent interactive session occurring between the second user account and the second service entity, wherein the activity information to be provided to the first service entity includes information indicating when the most recent interactive session occurred between the second user account and the second service entity.

3. The system of claim 1, further comprising one or more instructions, which when executed by the at least one processor, causes the account activity tracking system to:
determine if a most recent interactive session occurring between the second user account and the second service entity occurred within a period of time, wherein the activity information to be provided to the first service entity includes a binary value based on the determination.

4. The system of claim 1, wherein the second service entity is different from and physically distinct from the first service entity.

5. The system of claim 1, wherein the plurality of user accounts further include at least a third user account associated with a third service entity that has a third identifier stored within the collection, and the system further comprises one or more instructions, which when executed by the at least one processor, causes the at least one processor account activity tracking system to:
retrieve, from the collection at the account storage area, at least the second and third identifiers stored for the second and third user accounts that are linked to the first user account;

using the second and third identifiers, determine, from the activity information associated with the second and third user accounts stored at the activity storage area, a most recent interactive session occurring between each of the second user account and the second service entity and the third user account and the third service entity; and based on a determination that the most recent interactive session occurring between the second user account and the second service entity is more recent than the most recent interactive session occurring between the third user account and the third service entity, obtain the activity information associated with the second user account from the activity storage area for provision to the first service entity.

6. The system of claim 1, wherein the first user account and the second user account are for a same user.

7. The system of claim 6, wherein the second service entity is different from the first service entity.

8. The system of claim 1, further comprising one or more instructions, which when executed by the at least one processor, causes the account activity tracking system to:
generate a request, based on the first identifier associated with the first user account, for one or more identifiers linked to the first identifier;
provide the request to the second service entity; and
receive the second identifier associated with the second user account for storage in the collection at the account storage area.

9. The system of claim 1, further comprising one or more instructions, which when executed by the at least one processor, causes the account activity tracking system to:
generate a request, based on the second identifier, for interactive session information occurring between the second user account and the second service entity;
provide the request to the second service entity; and
receive the interactive session information associated with the second user account and the second service entity for storage in the activity storage area.

10. The system of claim 9, wherein the interactive session information is stored as a cookie.

11. A method comprising:
receiving, at an account activity tracking system, a plurality of user accounts associated with a plurality of service entities to be linked to one another, the plurality of user accounts including at least a first user account associated with a first service entity and a second user account associated with a second service entity;
to establish a link between the plurality of user accounts, storing an identifier for each of the plurality of user accounts within a collection at an account storage area associated with the account activity tracking system;
receiving, from the plurality of service entities, activity information associated with the plurality of user accounts;
storing the activity information in association with the identifier for each of the plurality of user accounts at an activity storage area associated with the account activity tracking system;
receiving, from the first service entity, an activity request including a first identifier associated with the first user account;
based on the first identifier associated with the first user account, retrieving at least a second identifier associated with the second user account from the collection at the account storage area;

using the second identifier to obtain activity information associated with the second user account from the activity storage area; and
causing the activity information associated with the second user account to be provided to the first service entity.

12. The method of claim 11, further comprising:
signing out the first user account from the first service entity if the activity information indicates that a most recent interactive session between the second user account and the second service entity occurred more than a threshold time duration from a first time.

13. The method of claim 12, wherein the first time corresponds to a most recent interactive session between the first user account and the first service entity.

14. The method of claim 12, wherein the first time corresponds to a sign-in event occurring between the first user account and the first service entity.

15. The method of claim 11, wherein the second service entity is different from and physically distinct from the first service entity.

16. The method of claim 11, wherein the plurality of user accounts further includes at least a third user account associated with a third service entity that has a third identifier stored within the collection, and the method further comprises:
retrieving, from the collection at the account storage area, at least the second and third identifiers stored for the second and third user accounts that are linked to the first user account;
using the second and third identifiers, determining, from the activity information associated with the second and third user accounts stored at the activity storage area, a most recent interactive session occurring between each of the second user account and the second service entity and the third user account and the third service entity; and
based on a determination that the most recent interactive session occurring between the second user account and the second service entity is more recent than the most recent interactive session occurring between the third user account and the third service entity, obtaining the activity information associated with the second user account from the activity storage area for provision to the first service entity.

17. The method of claim 11, wherein the first user account and the second user account are for a same user.

18. The method of claim 17, wherein the second service entity is different from the first service entity.

19. A computer-readable storage medium including instructions that, when executed by at least one processor, cause the at least one processor to:
generate, at a first service entity of a plurality of service entities, a first message including a first identifier associated with a first user account of the first service entity;
provide the first message to an account activity tracking system that is associated with an account storage area and an activity storage area, wherein:
the account storage area stores an identifier for each of a plurality of user accounts of the plurality of service entities linked to one another within a collection, the plurality of user accounts including at least the first user account of the first service entity and a second user account of a second service entity,
the activity storage area stores activity information associated with the plurality of user accounts received from the plurality of service entities, the activity information for each of the plurality of user accounts stored in association with the identifier for each of the plurality of user accounts, and in response to receiving the first message at the account activity tracking system:
- based on the first identifier associated with the first user account, at least a second identifier associated with the second user account is retrieved from the collection at the account storage area, and
- the second identifier is used to obtain activity information associated with the second user account from the activity storage area;

receive, from the account activity tracking system, a second message including an indication of lack of activity for the second user account based on the obtained activity information associated with the second user account; and sign out the first user account from the first service entity based on the received indication of lack of activity.

20. The computer-readable storage medium of claim 19, wherein the first user account and the second user account are for a same user.

\* \* \* \* \*